United States Patent Office 2,836,981
Patented June 3, 1958

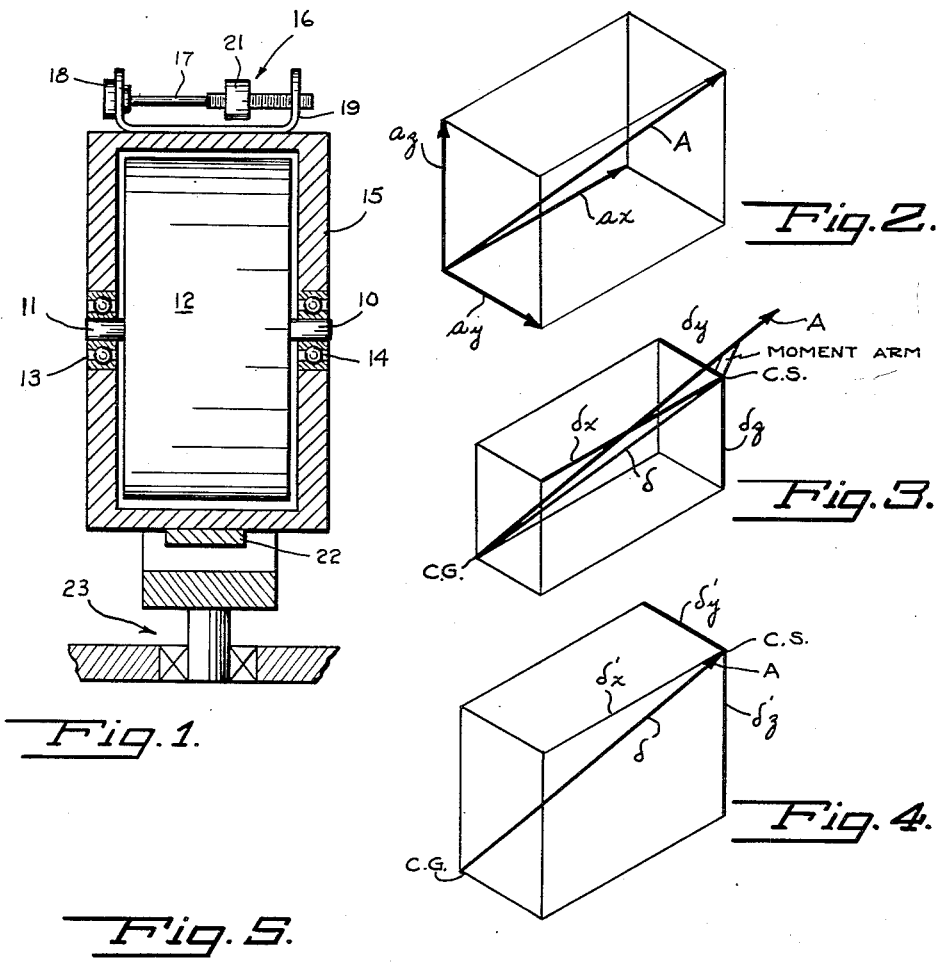

2,836,981

ACCELERATION ERROR COMPENSATION

Charles Karatzas Jackson Heights, and George H. Neugebauer, Northport, N. Y., assignors to American Bosch Arma Corporation, a corporation of New York Application August 8, 1955, Serial No. 527,086

3 Claims. (Cl. 74—5)

The present invention relates to gyroscopes and has particular reference to apparatus for compensating for errors due to weight shifts during acceleration.

The weight shift occuring in gyroscopes under acceleration and resulting from structural compliance may cause error producing torques. This will be true whenever the structural rigidity is not the same in all directions since the center of gravity will not be deflected along a line parallel to the direction of the acceleration.

The present invention makes the compliance of the center of gravity equal in each of three mutually perpendicular axes so that the center of gravity is always shifted along a line parallel to the acceleration force thereby eliminating the error producing torque due to weight shift. In a preferred embodiment a weight is mounted on a cantilever beam supported from the gyro casing. The compliance of the beam and the compliance of the structure combine to provide equal compliances in three mutually perpendicular directions.

For a more complete understanding of the invention, reference may be had to the accompanying diagram, in which:

Fig. 1 shows a typical gyroscope construction and the relative position of the compensator;

Fig. 2 shows the components of an acceleration;

Fig. 3 shows the displacement of the center of gravity of an uncompensated system, i. e. the deflection vector does not coincide with the acceleration vectors;

Fig. 4 shows the displacement of the center of gravity of a compensated system; and Fig. 5 shows the compensator in more detail.

Fig. 1 shows a cross section of a portion of a gyroscopic device and the method of mounting the compensator of the present invention thereon. In this figure, the shafts 10 and 11 of the rotating gyroscopic wheel are journalled within the respective bearings 13 and 14 in the casing 15.

It has been found that the compliance of the structural members, such as bearings 13, 14 or shafts 10, 11, is sufficiently large to permit a shift of the center of gravity of the system during acceleration of the gyro casing 15 and its support 23, which is schematically indicated in part in Fig. 1. When the support is subjected to an acceleration A such as in Fig. 2, where the component acceleration $ax$ is directed along the axis of shafts 10, 11 and the component accelerations $ay$ and $az$ are perpendicular to $ax$ and perpendicular to each other, the center of gravity may move from the center of support as shown in Fig. 3. Since the compliances in the X, Y and Z directions are not equal, the component distances $\delta x$, $\delta y$ and $\delta z$ through which the center of gravity is displaced are not equally proportional to the respective acceleration components $ax$, $ay$ and $az$. Since the acceleration vector, A, acting at the center of gravity does not pass through the center of support of the gyroscope, an error producing torque is applied to the gyroscope where the moment arm of the torque is such as shown in Fig. 3.

It will be seen in Fig. 4 that when the compliances in the X, Y and Z axes are equal, the displacements $\delta'x$, $\delta'y$ and $\delta'z$ are equally proportional to $ax$, $ay$ and $az$ respectively so that the acceleration vector passes through both the center of gravity and center of support whence no error torque is applied to the gyro. Accordingly, the present invention makes the compliance of the center of gravity equal in the X, Y and Z directions. To this end a compensator 16 which is shown in detail in Fig. 5 is mounted on the gyro casing 15 as shown in Fig. 1.

The compensator 16 includes a cantilever beam 17 having one end fixed in a mounting bushing 18 which is secured to frame 19. The free end of beam 17 carries a threaded screw 20, which may be an extension of beam 17, and a weight 21 thereon. It will be seen that the distance of the weight 21 from the fixed end of beam 17 is adjustable by rotation of weight 21.

The longitudinal axis of beam 17 is aligned along that axis of the structure having maximum compliance (minimum stiffness) which in Fig. 3 is the X axis. It was assumed in the illustrative example of Fig. 3, that the radial compliances (in the Y and Z directions) are equal. In this case the beam 17 may be of circular cross section. However, if it is found that the radial compliances are not equal in the Y and Z directions, the beam 17 may be of rectangular cross section such that the ratio of the stiffness of the beam 17 in the Y and Z directions is inversely proportional to the ratio of the stiffness of the uncompensated system in Y and Z directions.

It will be seen that when the compensator 16 is mounted on the top of casing 15 as shown in Fig. 1, a counterbalancing weight 22 will be required at the bottom of casing 15 to maintain required balance. The weight 22 may simply be a thickened wall of casing 15 or it may be another compensator similar to compensator 16. The second compensator at the bottom of the casing will be found advantageous when insufficient correction is obtained from one compensator, or for cases where the $y$ and $z$ compliances are unequal. In the latter case, the beam 17 of each compensator is rectangular with the stiffer axis of one compensator perpendicular to the stiffer axis of the other compensator.

Since the compliance of the beam 17 along the longitudinal axis is small the position of weight 21 will have little effect on the $x$ compliance and the values of the $y$ and $z$ compliances can be adjusted to the required value (equal to the $x$ compliance) simply by adjusting the position of the weight 21 on the screw 20 of a single compensator 16, or by adjusting both weights of a pair of compensators.

The effect of the compensation is to produce displacements $\delta'x$, $\delta'y$ and $\delta'z$ as shown in Fig. 4 where the displacements are equally proportional to the respective acceleration components $ax$, $ay$ and $az$. Thus, the center of gravity is deflected along a line parallel to the acceleration force thereby eliminating the error producing torques due to weight shift.

We claim:

1. In a device of the character described, a gyroscope, a casing for said gyroscope, a structure for supporting said casing, said structure having unequal compliances in at least two mutually perpendicular directions, a cantilever beam carried by said casing, a weight on said beam, said beam being mounted so as to have its maximum stiffness parallel to the direction of maximum compliance of said structure.

2. In a device of the character described, a gyroscope, a casing for said gyroscope, a structure for supporting said casing, said structure having unequal compliances in at least two mutually perpendicular directions, a cantilever beam carried by said casing, a weight on said beam, said beam being mounted so as to have its maximum stiffness parallel to the direction of maximum compliance of said structure and having a transverse stiffness inversely proportional to the stiffness of said structure in the corresponding transverse direction.

3. In a device of the character described, a gyroscope, a casing for said gyroscope, a structure for supporting said casing, said structure having unequal compliances in at least two mutually perpendicular directions, a cantilever beam carried by said casing, a weight on said beam, said beam being mounted so as to have its maximum stiffness parallel to the direction of maximum compliance of said structure and having a transverse stiffness ratio inversely proportional to the transverse stiffness ratio of said structure.

References Cited in the file of this patent

UNITED STATES PATENTS

| | | |
|---|---|---|
| 2,015,650 | Bates | Oct. 1, 1935 |
| 2,534,963 | Fowler | Dec. 19, 1950 |
| 2,559,298 | Hayes | July 3, 1951 |